US007876210B2

(12) United States Patent
Tsukida et al.

(10) Patent No.: US 7,876,210 B2
(45) Date of Patent: Jan. 25, 2011

(54) DIRECTION INDICATOR

(75) Inventors: Masaki Tsukida, Tochigi-ken (JP); Minoru Wada, Tochigi-ken (JP)

(73) Assignee: Komatsu Ltd., Tokyo (JP)

( * ) Notice: Subject to any disclaimer, the term of this patent is extended or adjusted under 35 U.S.C. 154(b) by 67 days.

(21) Appl. No.: 12/211,689

(22) Filed: Sep. 16, 2008

(65) Prior Publication Data

US 2009/0045935 A1 Feb. 19, 2009

Related U.S. Application Data

(62) Division of application No. 11/175,997, filed on Jul. 6, 2005, now Pat. No. 7,425,890.

(30) Foreign Application Priority Data

Jul. 8, 2004 (JP) .............................. 2004-201668

(51) Int. Cl.
*B60Q 1/40* (2006.01)
(52) U.S. Cl. ...................... 340/476; 340/475
(58) Field of Classification Search ................ 340/476, 340/475, 477, 438; 200/61.31–61.35
See application file for complete search history.

(56) References Cited

U.S. PATENT DOCUMENTS 3,794,785 A 2/1974 Tomlinson
4,333,071 A 6/1982 Kira et al.
4,403,211 A * 9/1983 Shibata et al. ............... 340/476
4,438,425 A * 3/1984 Tsuchida et al. ............ 340/476
4,660,020 A 4/1987 Miyamaru et al.
4,792,785 A 12/1988 Yukio et al.
4,962,366 A 10/1990 Hatanaka et al.
5,528,218 A 6/1996 Rigsby
6,414,593 B1 7/2002 Conner et al.
7,102,500 B2 * 9/2006 Martin et al. ............... 340/475

FOREIGN PATENT DOCUMENTS

JP 59-206243 11/1984
JP 2003-237461 8/2003

* cited by examiner

*Primary Examiner*—John A Tweel, Jr.
(74) *Attorney, Agent, or Firm*—Fish & Richardson P.C.

(57) ABSTRACT

If a turn signal switch is operated and a right-turn signal or a left-turn signal is input, a turn signal controller outputs a turn signal lamp lighting signal to a relay so as to make the turn signal lamp flash. Detection signals of an operating amount and an operating direction of a joy stick are input to a main controller, and the main controller detects a steering angle of the vehicle on the basis of the input detection signals, and outputs the steering angle to the turn signal controller. The turn signal controller determines that a course change is finished in case the input steering angle becomes smaller than a second steering angle after becoming larger than a first steering angle, and stops a turn signal lamp lighting signal on an output state so as to turn off a flashing turn signal lamp.

10 Claims, 9 Drawing Sheets

DIRECTION INDICATOR

CROSS-REFERENCE TO RELATED APPLICATIONS

This application is a divisional application of, and claims priority to 11/175,997, now U.S. Pat. No. 7,425,890 ('890 patent), entitled "Direction Indicator" to inventors Masaki Tsukida and Minoru Wada, which was filed on Jul. 6, 2005. The '890 patent claims priority to Japanese Patent Application 2004-201668 filed on Jul. 8, 2004. The specification of the above application is incorporated herein by reference in its entirety.

BACKGROUND OF THE INVENTION

1. Technical Field of the Invention

The present invention relates to a direction indicator for a vehicle, and more particularly, to a technique for automatically turning off a flashing turn signal lamp.

In the meantime, in a following description, as a generic name of actions for changing a course of the vehicle such as a right turn, a left turn, a lane change and the like, a term "a course change" is used. Further, a left and a right are used as terms indicating directions as seen from a rear side of a vehicle body.

2. Description of the Related Art

Conventionally there has been known a direction indicator which automatically turns off the flashing turn signal lamp on the basis of a rotating operation of a steering wheel. A direction indicator described in JP, A, 59-206243 is provided with a steering wheel angle sensor detecting an angle of a rotation of the steering wheel. It is possible to flash a turn signal lamp for a right turn or a turn signal lamp for a left turn by setting a turn signal switch to an operation position R for indicating the right turn or an operation position L for indicating the left turn. If the steering wheel turned to the right turn side or the left turn side starts being turned to a reverse direction, the steering wheel angle sensor detects an end of the right turn or the left turn, whereby it is possible to automatically turn off a flashing state of the turn signal lamp.

A direction indicator described in JP, A, 2003-237461 is provided with a rotational amount sensor detecting a rotational amount of a steering wheel. An end of the right turn or the left turn of the vehicle is detected by differentiating by time a detected signal from the rotational amount sensor in a controller. If the end of the right turn or the left turn of the vehicle is detected, it is possible to automatically turn off the flashing state of the turn signal lamp.

The direction indicators described in JP, A, 59-206243 and JP, A, 2003-237461 relate to a technique of automatically turning off the flashing of the turn signal lamp by detecting the rotation angle or the rotational amount of the steering wheel. However, for example, in a construction machine, a fork lift or the like, the steering wheel is not employed for executing a steering operation of the vehicle. In place thereof, a steering operation of the vehicle is executed by using steering means operated in a back and forth direction and a horizontal direction such as a joy stick or the like.

Since the steering wheel is not used in the vehicle steered by the joy stick, it is impossible to automatically turn off the flashing turn signal lamp by detecting the rotation angle or the rotational amount of the steering wheel. Accordingly, it is impossible to use the direction indicators described in JP, A, 59-206243 and JP, A, 2003-237461 as the direction indicator arranged in the vehicle steered by the joy stick.

Further, comparing the vehicle steered by the Joy stick with the vehicle steered by the steering wheel, for example, with respect to the case of intending to return the right turned wheel to a straight going state on the basis of the end of the right turn, the following differences exist. In other words, since the traveling direction of the vehicle is generally treated as a problem in the vehicle steered by the steering wheel, there is a little problem even if the turn signal lamp for the right turn is turned off at a time of intending to return to the straight going attitude by starting turning the steering wheel from the rotation in the right turn direction to the reverse direction.

On the contrary, in the vehicle steered by the joy stick, it is necessary to give a peripheral worker or the like a warning against the matter the course change from the right turn state to the straight going state is continuously executed. Accordingly, it is required to flash the turn signal lamp so as to issue a warning, for example, until the vehicle is returned to the straight going attitude at a certain degree from the right turn state, in view of a safety for executing the work.

SUMMARY OF THE INVENTION

An object of the invention is to provide a direction indicator which can automatically turn off a flashing of a turn signal lamp at a time when a vehicle is returned to an approximately straight going attitude from a right turn attitude or a left turn attitude of the vehicle, as a direction indicator arranged in the vehicle steered by a joy stick.

In order to achieve the object mentioned above, in accordance with a first invention of the direction indicator arranged in the vehicle steered by the joy stick, the following structure is the most main feature. In other words, the structure is made such that the first invention is provided with a turn signal switch making a turn signal lamp flash, a joy stick operation detector detecting an operation amount and an operation direction of a joy stick, and a turn signal controller executing a control on the basis of a steering angle of a vehicle detected by a detection signal from the joy stick operation detector. Further, the control on the basis of the steering angle is executed so as to automatically turn off the flashing turn signal lamp in a case that the steering angle of the vehicle becomes equal to or more than a predetermined first steering angle and thereafter becomes equal to or less than a predetermined second steering angle smaller than the first steering angle.

Further, in accordance with a second invention as a direction indicator arranged in an articulated type vehicle provided with a front vehicle body and a rear vehicle body which are articulated with each other, the following structure is the most main feature. In other words, the structure is made such that the second invention is provided with a turn signal switch making a turn signal lamp flash, a vehicle body bend detector detecting a vehicle body bending angle formed by the front vehicle body and the rear vehicle body, and a turn signal controller executing a control on the basis of a steering angle of a vehicle detected by a detection signal from the vehicle body bend detector. Further, the control on the basis of the steering angle is executed so as to automatically turn off the flashing turn signal lamp in a case that the steering angle of the vehicle becomes equal to or more than a predetermined first steering angle and thereafter becomes equal to or less than a predetermined second steering angle smaller than the first steering angle.

In accordance with the first invention of the present invention, even in the vehicle steered by the joy stick, if the traveling attitude is returned to the approximately straight going state after executing the course change on the basis of the steering operation, it is possible to automatically turn off the flashing turn signal lamp. Accordingly, it is possible to make the turn signal lamp flash until the vehicle attitude of the approximately straight going state after the course change is executed, and it is possible to issue a worker executing a work around the vehicle a warning.

Further, it is possible to automatically turn off the turn signal lamp by returning the vehicle attitude to the approximately straight going state after executing the course change of the vehicle at a predetermined angle or more. This inversely means that the flashing turn signal lamp is not automatically turned off unless the course change of the vehicle is executed at the predetermined angle or more.

Accordingly, for example, in the case that the course change of the vehicle is repeated within a small angle range, it is possible to always make the turn signal lamp flash. In other words, since the turn signal lamp is not automatically turned off in the case that the small course change is repeated, it is possible to remove the burden of turning on the turn signal switch every time when the small course change is executed, and it is possible to always secure a safety around the vehicle.

In accordance with the second invention of the present invention, even in the articulated vehicle, if the traveling attitude is returned to the approximately straight going state after executing the course change on the basis of the steering operation, it is possible to automatically turn off the flashing turn signal lamp. Accordingly, it is possible to make the turn signal lamp flash until the vehicle attitude of the approximately straight going state after the course change is executed, and it is possible to issue a worker executing a work around the vehicle a warning.

Further, in the second invention, in the same manner as the first invention, for example, even in the case that the course change of the vehicle is repeated within a small angle range, it is possible to prevent the flashing turn signal lamp from being automatically turned off, so that it is possible to remove the burden of turning on the turn signal switch every time when the small course change is executed. Accordingly, it is possible to always secure a safety around the vehicle.

DESCRIPTION OF THE PREFERRED EMBODIMENTS

A description will be given of embodiments of a direction indicator in accordance with the invention with reference to the accompanying drawings. In the following description, a description will be given by exemplifying a direction indicator arranged in a wheel loader. The direction indicator in accordance with the invention can be well applied to various working vehicles such as a motorized grader, a hydraulic excavator and the like, in addition to the wheel loader. Accordingly, the vehicle provided with the direction indicator in accordance with the invention is not limited to the wheel loader described below, but can be arranged in the various working vehicles.

First Embodiment

Figure 1:
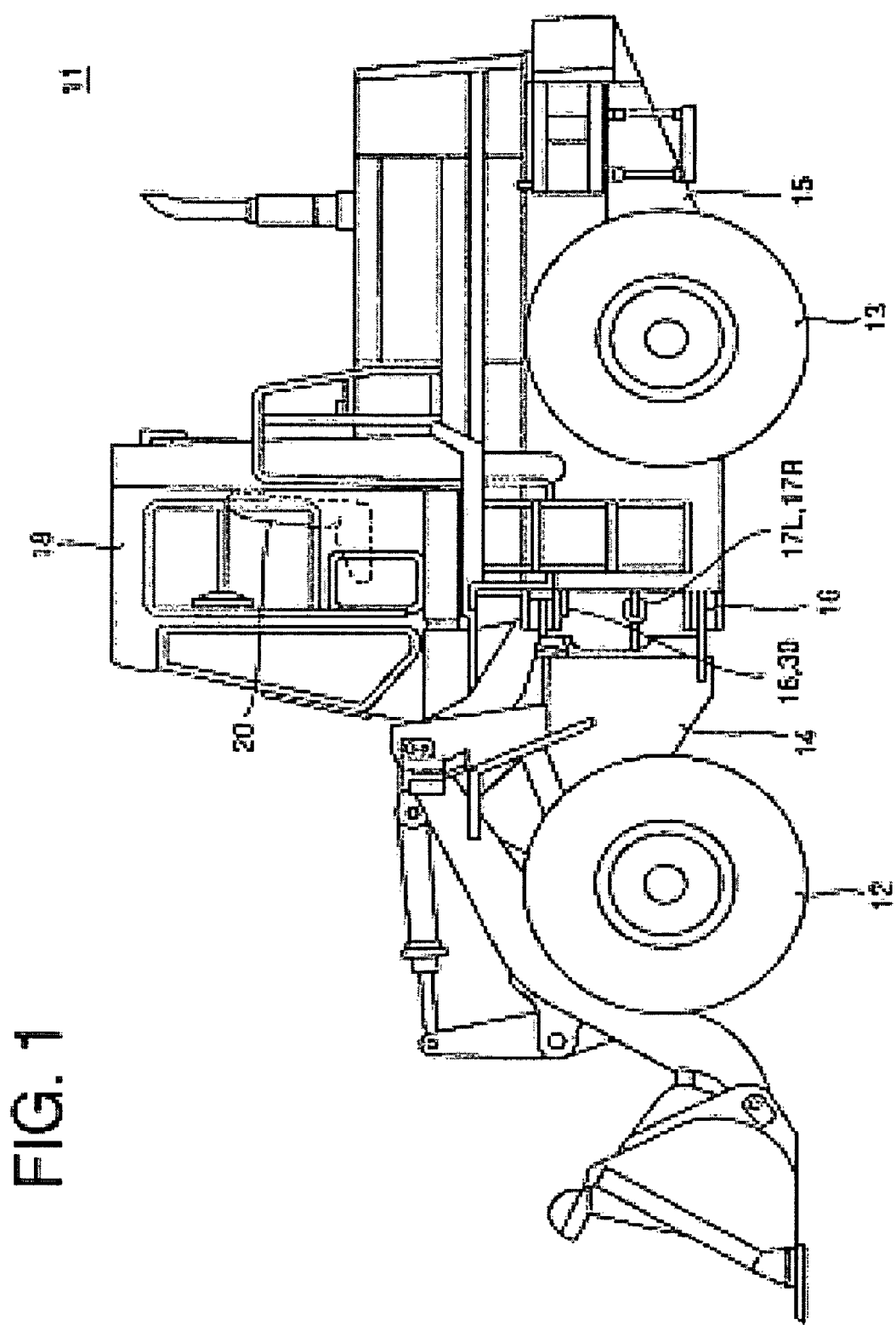
FIG. 1 is a side elevational view of a wheel loader in accordance with the invention.

A description will be given of a first embodiment of the invention with reference to FIGS. 1 to 7. FIG. 1 shows a side elevational view of a wheel loader 11. The wheel loader 11 is provided with a front vehicle body 14 to which a front wheel 12 is attached, and a rear vehicle body 15 to which a rear wheel 13 is attached. The front vehicle body 14 and the rear vehicle body 15 are coupled so as to be rotatable within an approximately horizontal surface by a pair of rotary pins 16 and 16. A vehicle body bend detecting portion detecting a vehicle body bending angle formed by the front vehicle body 14 and the rear vehicle body 15 is arranged near one rotary pin 16 arranged in an upper side in FIG. 1. The vehicle body bend detecting portion is constituted by a first potentiometer 30.

Further, the front vehicle body 14 and the rear vehicle body 15 are connected therebetween by a pair of left and right steering cylinders 17L and 17R for steering. A cabin 18 is mounted in an upper portion of the rear vehicle body 15, and an operator seat 20 on which an operator sits is provided in an inner portion of the cabin 18.

Figure 2:
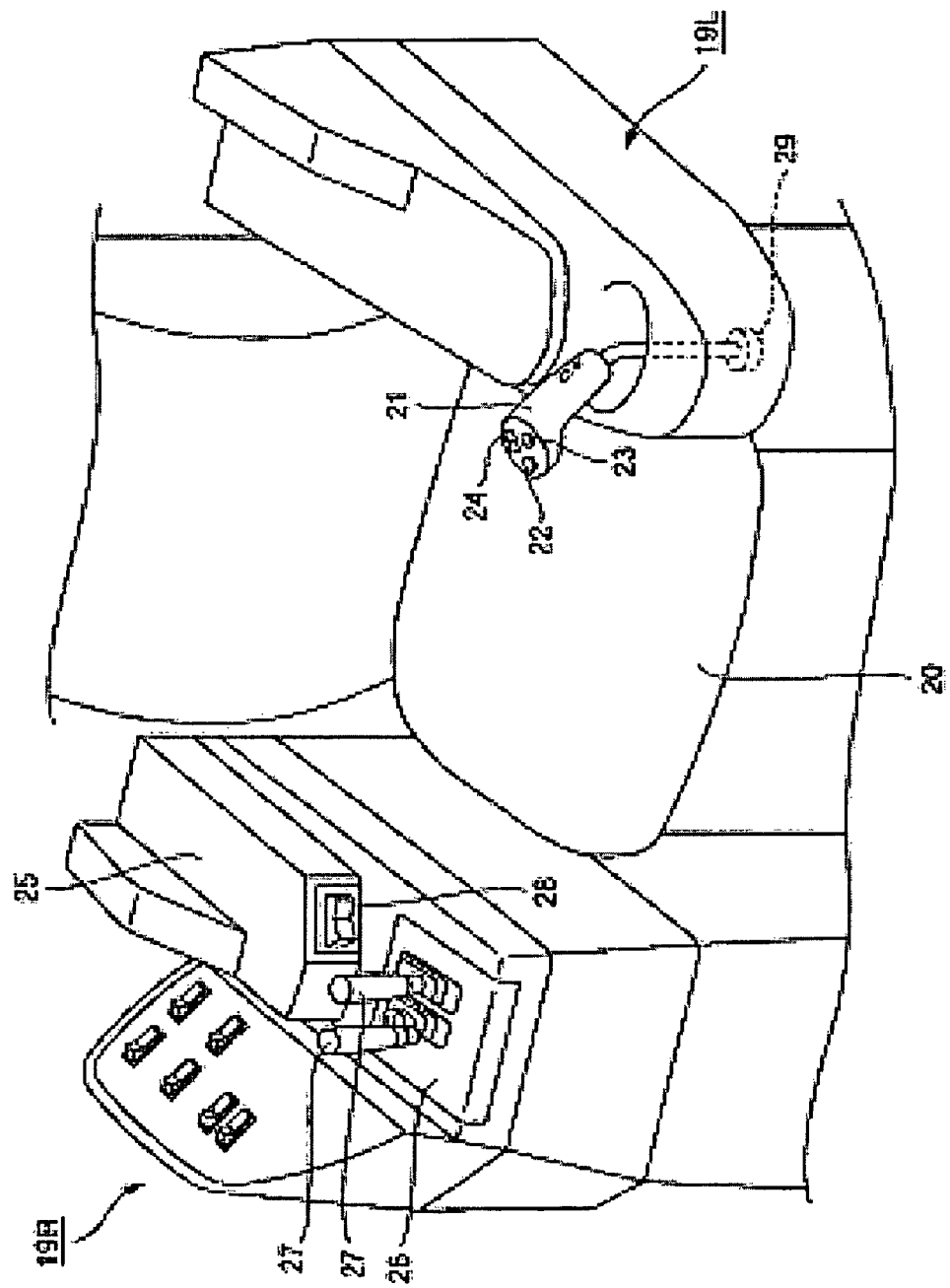
FIG. 2 is a perspective view near an operator seat in accordance with the invention.

FIG. 2 shows a perspective view near the operator seat 20. In FIG. 2, a left arm rest 19L is provided in a left side of the operator seat 20. A joy stick 21 executing a steering operation of the wheel loader 11 is provided in a rising manner in a front side of the left arm rest 19L. An upper portion of the joy stick 21 is provided with a shift up switch 22, a shift down switch 23 and a forward and backward movement changing switch 24.

When tilting the joy stick 21 to the left, the right operating cylinder 17R is expanded in correspondence to an operation amount, and the left steering cylinder 17R is contracted. Accordingly, the vehicle is steered so as to be turned in a leftward direction. Further, when tilting the joy stick 21 to the right, the right operating cylinder 17R is inversely contracted, and the left steering cylinder 17L is expanded. Accordingly, the vehicle is steered so as to be turned in a rightward direction.

A joy stick operation detector detecting an operating amount and an operating direction of the joy stick 21 is arranged in a root of the joy stick 21. The joy stick operation detector is constituted by a second potentiometer 29.

A right arm rest 19R is provided in a right side of the operator seat 20. The right arm rest 19R is provided with an elbow rest portion 25 on which the operator can put an elbow and an arm, and a lever placing portion 26 structured one stage lower in a front side of the elbow rest portion 25. Two working machine operating levers 27 and 27 for operating the working machine are provided in a rising manner in the lever placing portion 26. Further, a turn signal switch 28 of a momentary type and a seesaw type is provided in a front end surface of the elbow placing portion 25.

Figure 3:
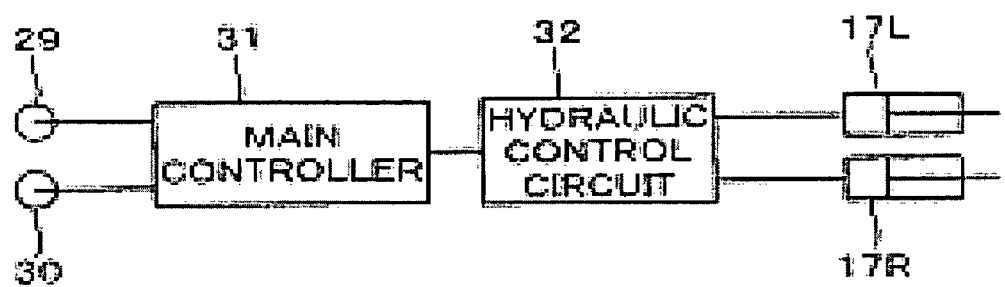
FIG. 3 is a view of a system configuration of a steering mechanism in accordance with the invention.

FIG. 3 shows a system configuration view of a steering mechanism executing the steering operation of the vehicle. In FIG. 3, an output signal from the first potentiometer 30 and an output signal from the second potentiometer 29 are input to a main controller 31. A hydraulic control circuit 32 for driving the steering cylinders 17L and 17R is connected to the main controller 31.

The main controller 31 can output a steering signal in correspondence to the output signal from the second potentiometer 29 to the hydraulic control circuit 32. Further, the main controller 31 can execute a control of the steering signal while feeding back the output signal from the first potentiometer 30. The hydraulic control circuit 32 drives the steering cylinders 17L and 17R respectively on the basis of the steering signals output from the main controller 31.

The main controller 31 can computes a steering angle θ of the vehicle on the basis of at least any one output signal of the output signal from the second potentiometer 29 and the output signal from the first potentiometer 30.

Figure 4:
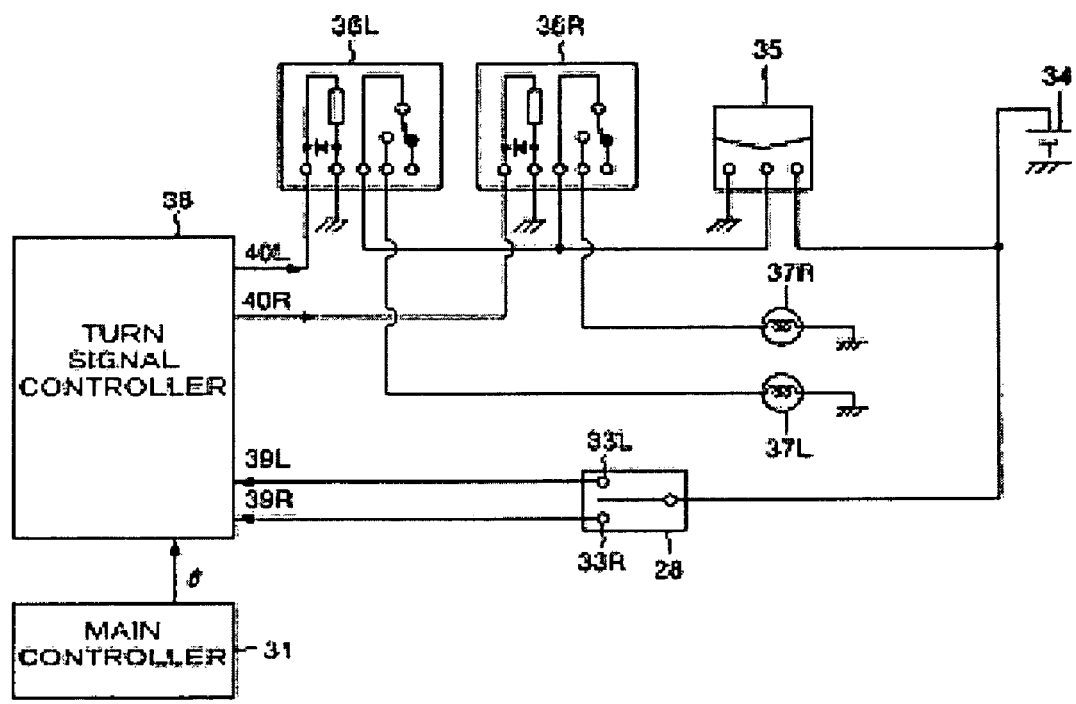
FIG. 4 is a view of a system configuration of an operating mechanism of a direction indicator in accordance with the invention.

FIG. 4 shows a system configuration view in the operating mechanism of the direction indicator. As shown in FIG. 4, the operating mechanism of the direction indicator is provided with a power source 34 such as a battery or the like, a flasher 35 constituted by a switch periodically repeating a conduction and a non-conduction, left and right relays 36L and 36R, left and right turn signal lamps 37L and 37R, a momentary type turn signal switch 28 provided with a left turn side contact point 33L and a right turn side contact point 33R and a turn signal controller 38 controlling the operating mechanism. The turn signal controller 38 is electrically connected to the main controller 31, and inputs the steering angle θ output from the main controller 31.

A description will be given of an operation in the operating mechanism of the direction indicator with regard to the next case. In other words, a description will be given of the operation in the case that the operator moves the turn signal switch 28 from a neutral position to a right turn position in a state in which both of the turn signal lamps 37L and 37R do not flash.

When the operator moves the turn signal switch 28 from the neutral position to the right turn position, the power source 34 and the right turn side contact point 33R of the turn signal switch 28 are conducted. Accordingly, a right-turn signal 39R is input to the turn signal controller 38. When the operator releases his or her hand from the turn signal switch 28, the turn signal switch 28 is automatically returned to the neutral position. Accordingly, the input of the right-turn signal 39R to the turn signal controller 38 is shut off.

The turn signal controller 38 continuously outputs a right turn signal lamp lighting signal 40R to the right relay 36R on the basis of the input right-turn signal. Accordingly, the right relay 36R is conducted, and a current from the power source 34 flows to the right turn signal lamp 37R through the flasher 35 and the right relay 36. Since the flasher 35 periodically repeats the conduction and non-conduction, the right turn signal lamp 37R flashes.

In the case of moving the turn signal switch 28 from the neutral position to the left turn position, a similar operation to the case mentioned above of moving the turn signal switch 28 from the neutral position to the right turn position is executed. In this case, the turn signal controller 38 outputs a left turn signal lamp lighting signal 40L on the basis of the left-turn signal 39L, and makes the left turn signal lamp 37L flash.

Next, a description will be given of a flow chart shown in FIG. 5 by exemplifying a case that the operator re-operates the turn signal switch 28 during a period that the turn signal lamp 37L or the turn signal lamp 37R flashes. In other words, a description will be given of a control step in the turn signal controller 38 with reference to the flow chart shown in FIG. 5.

Figure 5:
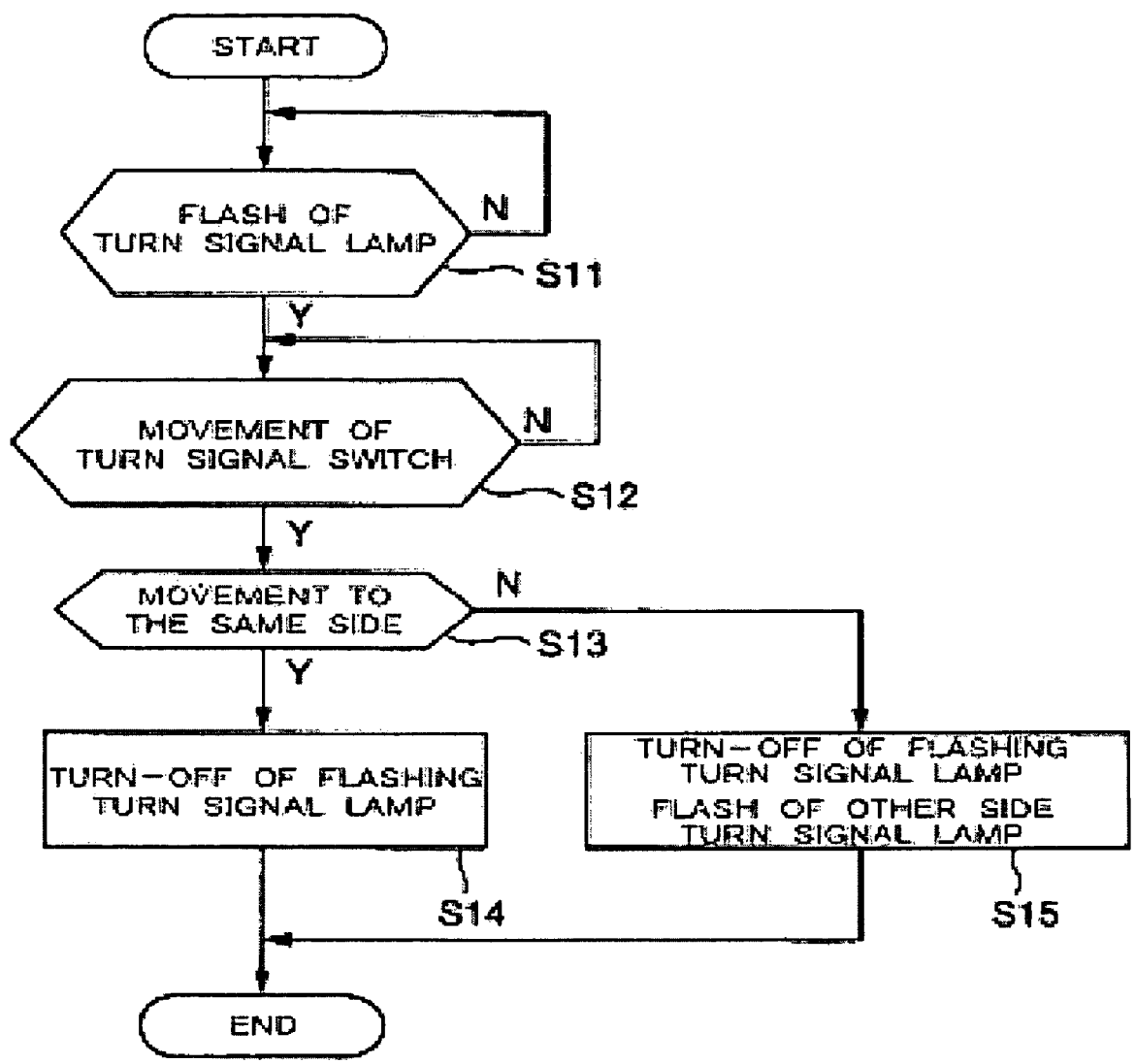
FIG. 5 is a flow chart showing a control flow of a main controller in accordance with the invention.

In FIG. 5, a step S11 determines whether or not one side turn signal lamp 37L or 37R is made flash. In the case that the turn signal lamp 37L or 37R flashes, the step goes to a step S12.

The step S12 determines whether or not the turn signal switch 28 is moved again. In the case that the turn signal switch 28 is moved again, the step goes to a step S13.

The step S13 determines whether the turn signal switch 28 is moved to the same side as the flashing turn signal lamp 37L or 37R (a side of flashing the flashing turn signal lamp), or is moved to the different side (a side of flashing the extinguishing turn signal lamp).

If the step S13 determines that the turn signal switch 28 is again moved to the same side as the flashing turn signal lamp 37L or 37R, the step goes to a step S14.

The step S14 determines that the operator finishes an intended course change, and turns off the flashing turn signal lamp 37L or 37R.

On the contrary, the step S13 determines that the turn signal switch 28 is moved to the different side from the flashing turn signal lamp 37L or 37R, the step goes to a step S15.

The step S15 determines that the operator changes the direction of the course change which is once intended, to an opposite direction, turns off the flashing turn signal lamp 37L or 37R, and makes the non-flashing turn signal lamp 37R or 37L flash.

For example, a description will be given as follows of the flow chart in FIG. 5 with regard to the case of an assumption that the right turn signal lamp 37R flashes in the step S11, and the left turn signal lamp 37L turns off. If the step S13 determines that the turn signal switch 28 is again moved to the same side so as to make the right turn signal lamp 37 flash, the step goes to the step S14, and turns off the flashing right turn signal lamp 37R.

On the contrary, if the step S13 determines that the turn signal switch 28 is moved to the different side from the flashing right turn signal lamp 37R in such a manner as to make the left turn signal lamp 37R flash, the step goes to a step S15. The step S15 turns off the flashing right turn signal lamp 37R and makes the not-flashing left turn signal lamp 37R flash.

Figure 6:
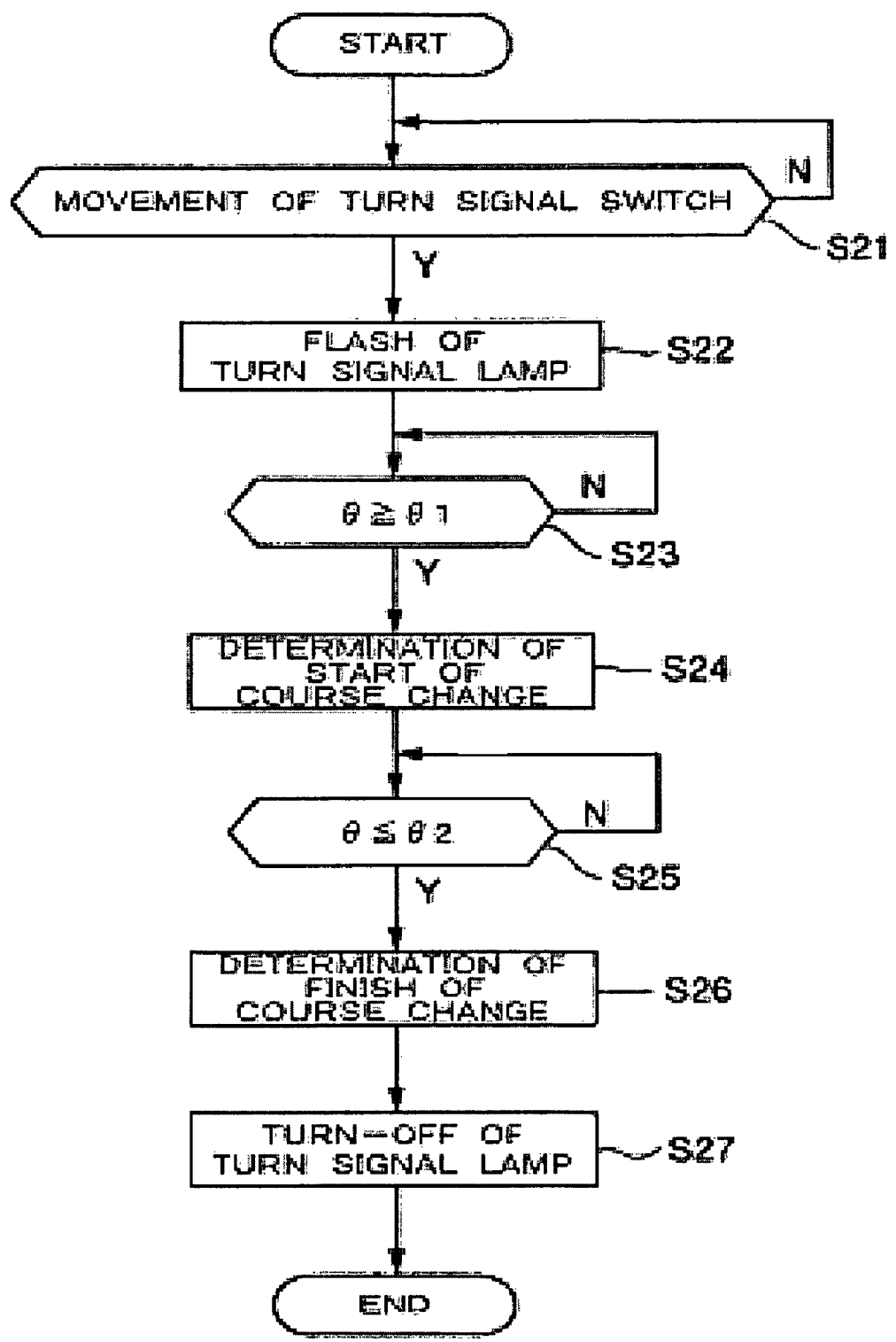
FIG. 6 is a flow chart showing a control flow of a turn signal controller in accordance with the invention.
Figure 7:
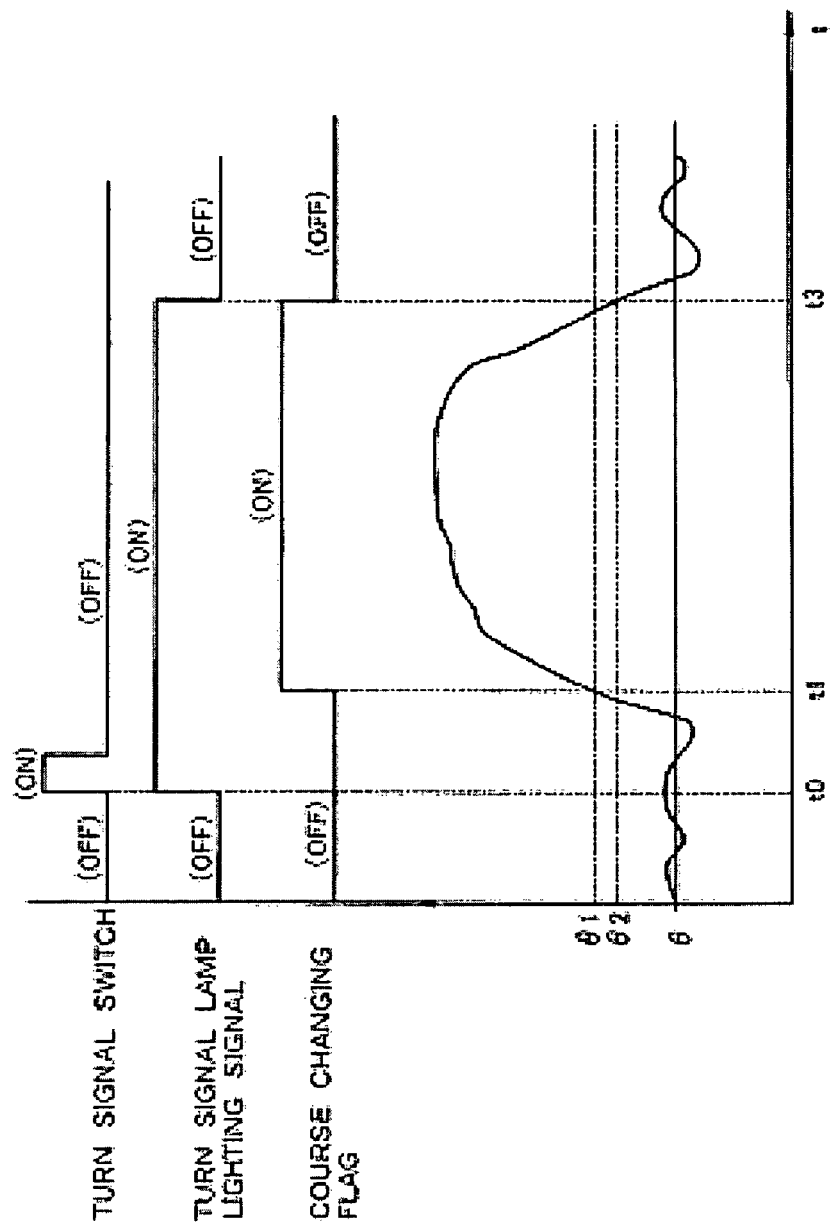
FIG. 7 is a timing chart from a start of a course change to an end of the course change in accordance with the invention.

A flow chart shown in FIG. 6 shows one example of a procedure executed within the turn signal controller 38 from the start of the course change to the end of the course change in the structure as mentioned above. Further, FIG. 7 shows a timing chart from the start of the course change to the end of the course change. In FIG. 7, a horizontal axis shows a time axis, and a vertical axis shows an operating state of the turn signal switch 28, an output state of the turn signal lamp lighting signals 40L or 40R, an output state of a flag showing a course changing time mentioned below and a steering angle θ of the vehicle from the top of the axis.

In FIG. 6, a step S21 determines whether or not the turn signal switch 28 is moved to the right turn position or the left turn position. The step waits until the turn signal switch 28 is moved to the right turn position or the left turn position. This state shows a state till a time t0 in FIG. 7.

If the step S21 determines that the turn signal switch 28 is moved to the right turn position or the left turn position, the step goes to a step S22. The step S22 makes the turn signal lamp 37R or 37L flash in correspondence to the right turn position or the left turn position at which the turn signal switch 28 is moved.

This state shows the time t0 in FIG. 7 and a short time after the time t0. In other words, if the turn signal switch 28 is moved at the time t0, the right-turn signal 39R or the left-turn signal 39L shown in FIG. 4 is output so as to establish an ON state. When the operator releases his or her hand from the turn signal switch 28, the turn signal switch 28 is automatically returned to the neutral position, and the right-turn signal 39R or the left-turn signal 39L becomes in an OFF state.

As a turn signal lamp flashing signal, a turn signal lamp flashing signal 40R or 40L is output from the turn signal controller 38 so as to establish the ON state. Even if the right-turn signal 39R or the left-turn signal 39L becomes in the OFF state, the turn signal lamp flashing signal 40R or 40L maintains the ON state, and the turn signal lamp 37R or 37L maintains the flashing state.

During this time, the vehicle becomes in a straight going state, or the course change to the right or the left is executed in some degree. Accordingly, as shown by the steering angle o of the vehicle, a little variation of the steering angle may be generated.

A step S23 determines whether or not the steering angle $\theta$ of the vehicle input from the main controller 31 becomes larger than a previously set first steering angle $\theta_1$. When the steering angle $\theta$ of the vehicle is steered at a predetermined angle or more, the vehicle sets the steering angle which can determined the start of the course change as the first steering angle $\theta_1$.

If the step S23 determines that the steering angle $\theta$ of the vehicle becomes larger than the first steering angle $\theta_1$, the step goes to a step S24, and determines that the vehicle starts the course change. Even in this state, the flashing state of the flashing turn signal lamp 37R or 37L is maintained.

A description will be given of a state from the step S23 to the step S24 with reference to FIG. 7. The state from the step S23 to the step S24 can be shown as a state passing a time t0 to a time t1 in FIG. 7. If the steering angle $\theta$ becomes larger than the first steering angle $\theta_1$ at the time t1, the step determines that the vehicle is under the course change so as to set the course changing flag to the ON state.

Turning back to FIG. 6, a step S25 determines whether or not the steering angle $\theta$ input from the main controller 31 becomes smaller than a previously set second steering angle $\theta_2$. When the steering angle $\theta$ of the vehicle is returned to the predetermined angle or less, the vehicle sets the steering angle which can determine the end of the course change as the second steering angle $\theta_2$. An angle of the first steering angle $\theta_1$ forms a set together with an angle of the second steering angle $\theta_2$, and the second steering angle 62 is previously set as an angle which is smaller than the first steering angle $\theta_1$.

A step S26 determines that the course change is finished, and the step goes to a step S27. The step S27 stops the output of the turn signal lamp lighting signal 40R or 40L, and turns off the flashing turn signal lamp 37R or 37L.

A description will be given of a state from the step S25 to the step S27 with reference to FIG. 7. As shown by the steering angle $\theta$ in FIG. 7, the control of the steering angle $\theta$ is executed in such a manner as to reduce the excessively turned steering angle $\theta$ for returning the vehicle to the straight going state after the steering angle $\theta$ of the vehicle is excessively turned for executing the right turn or the left turn. At a time t3 when the steering angle $\theta$ becomes smaller than the second steering angle $\theta_2$, the course changing flag is set to the OFF state on the assumption that the course change is finished. At the same time, the turn signal lamp lighting signal 40R or 40L is turned off, and the flashing turn signal lamp 37R or 37L is turned off.

In the case of setting the second steering angle $\theta_2$ as the large steering angle, if the steering angle is returned only for a little time after the steering angle $\theta$ of the vehicle is excessively turned for executing the right turn or the left turn, the turn signal controller 38 determines that the steering angle $\theta$ becomes equal to or less than the second steering angle $\theta_2$ and the course change of the vehicle is finished. Accordingly, in spite that the control of the steering angle $\theta$ is executed for returning the vehicle to the straight going direction, the flashing turn signal lamp 37R or 37L is turned off.

In order to return the vehicle to the attitude in the straight going state, the vehicle is steered in the inverse direction to the currently steered course changing direction. Accordingly, there is a risk that the worker or the like around the vehicle determines that the vehicle goes straight under the current attitude because the flashing turn signal lamp is turned off. Therefore, the second steering angle $\theta_2$ is set to an angle of the steering angle which can be determined that the vehicle is returned approximately to the straight going attitude.

The first steering angle $\theta_1$ can be set, for example, to an angle which is about one third of the maximum steering angle $\theta_{max}$ at a time when the vehicle executes the course change. Further, the second steering angle $\theta_2$ can be set to an angle which is some degree smaller than the first steering angle $\theta_1$.

In this case, the first steering angle $\theta_1$ and the second steering angle $\theta_2$ mentioned above are exemplified, however, can be respectively set in correspondence to a sensitivity of the operator. Alternatively, they can be set from a range of the steering angle which the vehicle of each of types most frequently uses, in correspondence to the type of the working vehicle in which the direction indicator is arranged.

Further, if the magnitude of the first steering angle $\theta_1$ is set as a small angle, it is determined that the course change is started even in the case that a small course change is executed before executing the right turn or the left turn largely. Further, since the second steering angle $\theta_2$ is set as the first steering angle which is smaller than the first steering angle $\theta_1$, the course changing flag is turned to the OFF state on the basis of the small course change executed before the large course change, thereby turning off the flashing turn signal lamp 37R or 37L. Accordingly, it is necessary to move the turn signal switch 28 again, and it is necessary to move the turn signal switch 28 several times before the large course change.

The respective angles of the first steering angle $\theta_1$ and the second steering angle $\theta_2$ can be freely changed, for example, by changing a program of the turn signal controller 38. Alternatively, the respective angles of the first steering angle $\theta_1$ and the second steering angle $\theta_2$ can be freely changed by using an input means such as an external input switch (not shown) or the like.

In this case, there is a case that the operator re-operates the turn signal switch 28 during the execution of the step S22 to the step S26. In this case, the turn signal controller 38 executes the control of the turn signal lamp 37R or 37L on the basis of the output from the main controller 31 controlling in accordance with the step S11 to the step S15 in the flow chart shown in FIG. 5.

In other words, as in the control in the step S14, the flashing turn signal lamp 37R or 37L is turned off in correspondence to the motion of the operated turn signal switch 28. Alternatively, as in the control in the step S15, the turn signal lamp 37R or 37L which has been under flashing is turned off, and the turn signal lamp 37L or 37R which has been under extinction is made flash.

As described above, in accordance with the embodiment on the basis of the present invention, it is possible to securely turn off the flashing turn signal lamp 37R or 37L in a stage in which the course change is approximately finished, in the vehicle in which the steering wheel is not used for steering the vehicle. Further, the start and the end of the course change are detected by comparing the steering angle θ with the previously set first steering angle $θ_1$ and steering angle $θ_2$ respectively.

Accordingly, it is possible to change the angles of the first steering angle $θ_1$ and the second steering angle $θ_2$ so as to achieve a timing which the operator feels preferable. Therefore, it is possible to adjust a timing of turning on the course changing flag, and a time of turning off the flashing turn signal lamp 37R or 37L.

In this case, in the illustrated embodiment, the momentary type seesaw switch is shown as the turn signal switch 28, however, the turn signal switch 28 is not limited to the switch in accordance with the illustrated embodiment. For example, it is possible to employ a momentary type lever switch, and a momentary type push button switch provided with two buttons comprising a right turn button and a left turn button.

Second Embodiment

A description will be given of a second embodiment of the invention with reference to FIGS. 8 and 9. In the embodiment 2, a structure of the turn signal switch 28 is different from the structure of the turn signal switch 28 in accordance with the embodiment 1. The other structures are the same as the structures in the embodiment 1. Accordingly, with respect to the same structures as those of the embodiment 1, a description of the members will be omitted by using the reference numerals used in the embodiment 1. Further, although an internal structure of the turn signal switch is different between the embodiment 1 and the embodiment 2, the same function is provided as the turn signal switch for making the turn signal lamp flash. Therefore, reference numeral 28 is commonly used as the reference numerals for the turn signal switch between the embodiment 1 and the embodiment 2.

Figure 8:
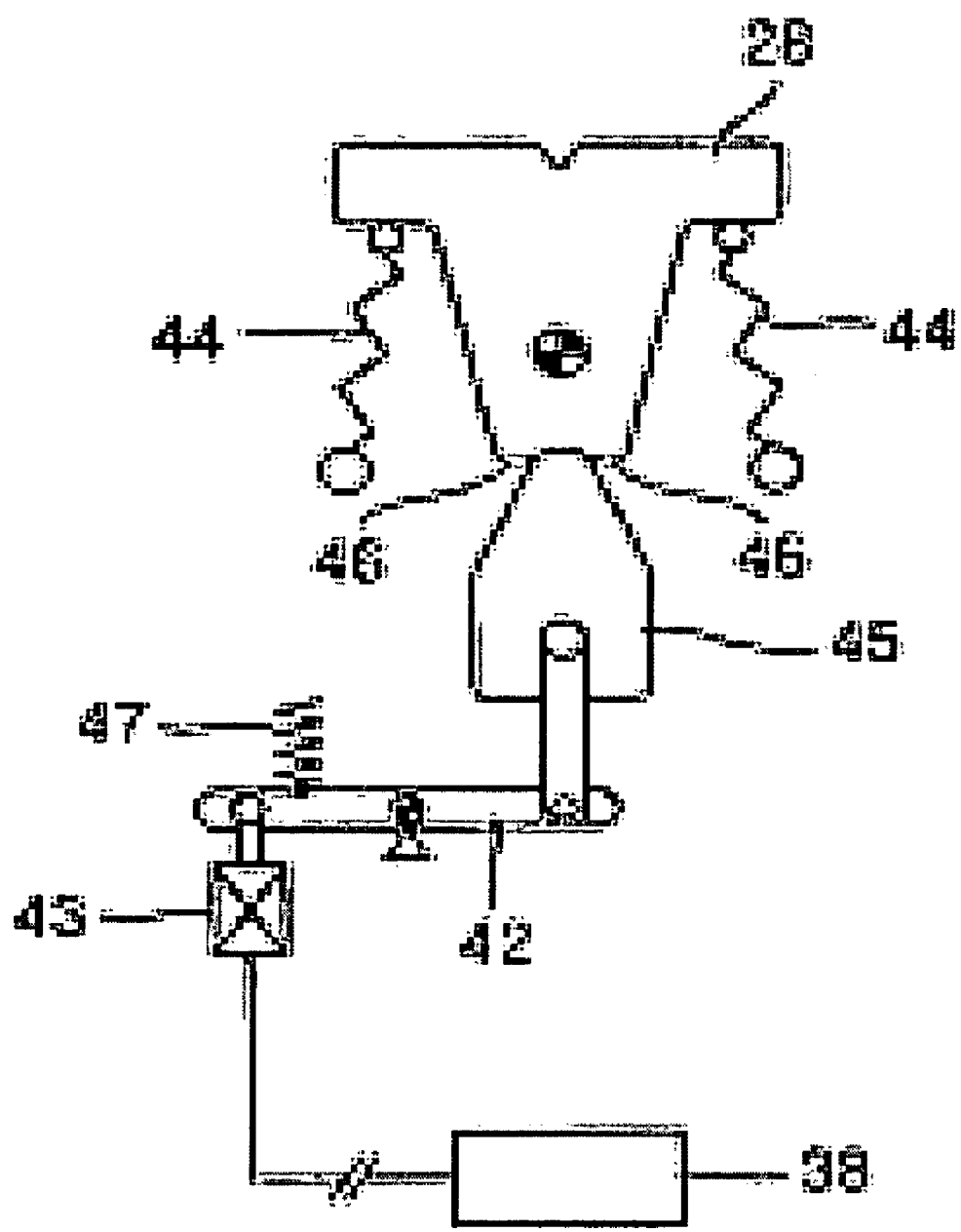
FIG. 8 is an explanatory view of the other turn signal switch in accordance with the invention.
Figure 9:
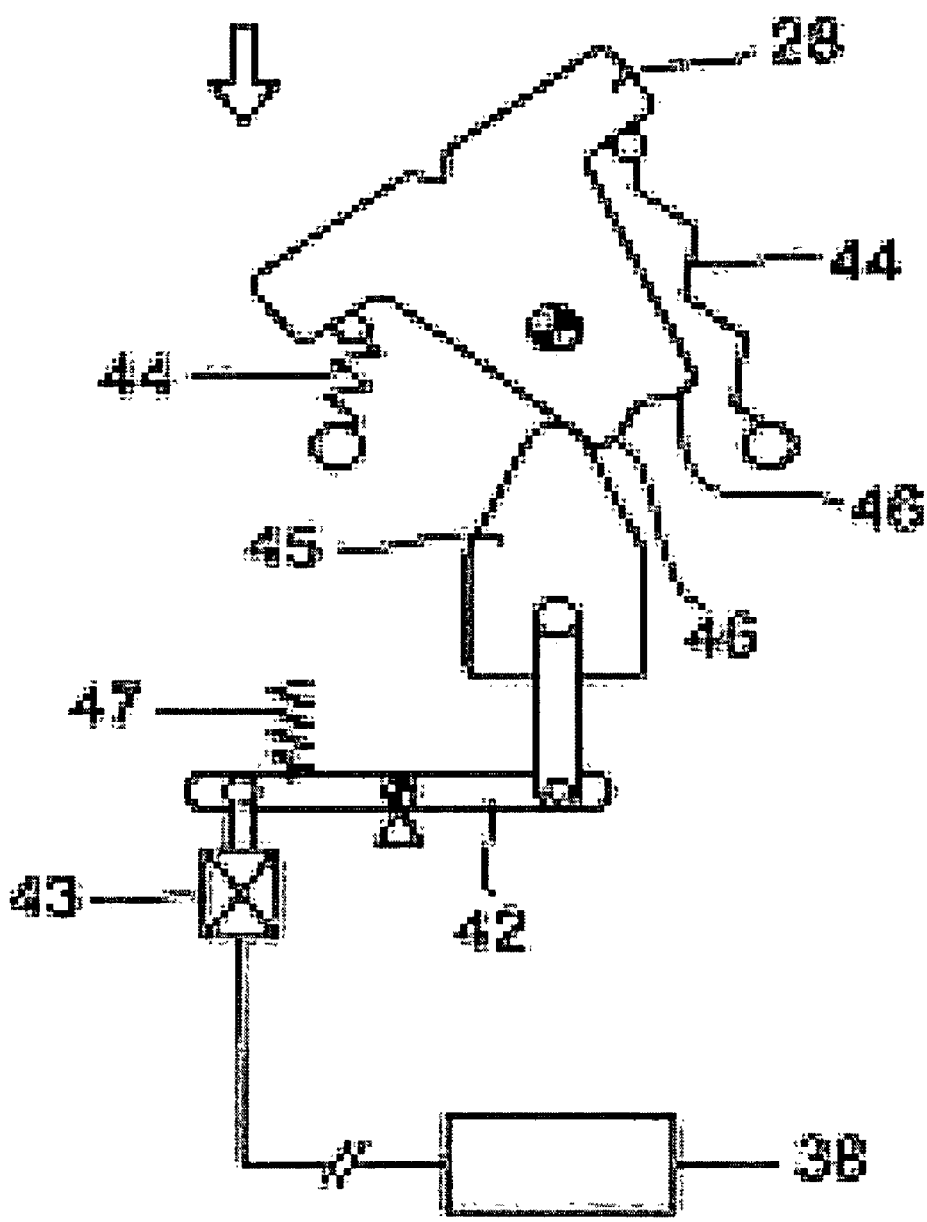
FIG. 9 is an explanatory view showing an operating state of the other turn signal switch in accordance with the invention.

FIGS. 8 and 9 show the structure of the turn signal switch. As the turn signal switch 28, there is shown a three-position alternate type seesaw switch which can stop at three positions comprising the right turn position, the neutral position and the left turn position.

In FIG. 8, the position of the turn signal switch 28 corresponds to the neutral position. Further, in FIG. 9, the position of the turn signal switch 28 corresponds to the left turn position. A pair of left and right springs 44 and 44 is attached to both sides of the turn signal switch 28. A pair of springs 44 and 44 has a function of always returning the turn signal switch 28 to the neutral position.

Two right and left projections 46 and 46 are provided in a rear end portion of the turn signal switch 28, and a concave portion is formed between two projections 46 and 46. Further, a lock plate 45 attached to a leading end portion of a link 42 is pressed to a rear end portion of the turn signal switch 28 on the basis of an energizing force of the spring 47.

When operating the turn signal switch 28, the lock plate 45 is pushed by the projection 46, and is moved in a vertical direction in FIGS. 8 and 9 against the energizing force of the spring 47.

An approximately center portion of the link 42 is rotatably supported to a vehicle body (not shown). Further, a plunger 43 controlled so as to be expanded and contracted on the basis of the output signal from the turn signal controller 38 is attached to a base end portion of the link 42. In general, the plunger 43 is in the contracted state. At this time, the lock plate 45 is pressed to the rear end portion of the turn signal switch 28 as mentioned above.

Next, a description will be given, for example, of a case that the operator moves the turn signal switch 28 from the neutral position shown in FIG. 8 to the left turn position shown in FIG. 9. When the turn signal switch 28 is moved from the neutral position to the left turn position, the lock plate 45 fitted to the concave portion in the rear end portion of the turn signal switch 28 is pushed by the projection 45 so as to move to the lower side in FIG. 8.

When the turn signal switch 28 is moved to the left turn position, the lock plate 45 is again moved to an upper side on the basis of the energizing force of the spring 47. The lock plate 45 moving to the upper side is caught on the left projection 46 of the turn signal switch 28 as shown in FIG. 9, and keeps the turn signal switch 28 at the left turn position against the energizing force of a pair of springs 44 and 44.

Accordingly, the structure is made such that the position of the turn signal switch 28 is not changed except the case of being moved by the operator. With respect to the case that the turn signal switch 28 is moved to the right turn position, the same operation as that of the case of moving to the left turn position is applied.

Further, when the plunger 43 is elongated, the lock plate 45 is moved apart from the turn signal switch 28. The turn signal switch 28 is automatically returned to the neutral position on the basis of the energizing force of a pair of springs 44 and 44.

In this case, when moving the turn signal switch 28 to the neutral position side from the state shown in FIG. 9, the lock plate 45 is pressed by the left projection 46 of the turn signal switch 28, and moves to a lower side while being in contact with the projection 46 by setting the projection 46 as a cam surface. Thereafter, the lock plate 45 is fitted to the concave portion between a pair of projections 46 and 46. As mentioned above, it is possible to return the turn signal switch 28 to the neutral position manually.

In the direction indicator having the turn signal switch 28 of the structure mentioned above, it is possible to execute the same control described in the embodiment 1 by the turn signal controller 38, by inputting the steering angle θ output from the main controller 31 to the turn signal controller 38. In the turn signal controller 38, it is possible to determine the start of the course change by comparing the steering angle θ input from the main controller 31 with the first steering angle $θ_1$.

Further, it is possible to determine the end of the course change by comparing the steering angle θ input from the main controller 31 with the second steering angle $θ_2$ after determining the start of the course change. The control steps are constituted by the same control steps as the steps S23 to S26 in FIG. 6.

If the turn signal controller 38 determines that the end of the course change, the turn signal controller 38 stops the output of the turn signal lamp lighting signal and turns off the flashing turn signal lamp 37R or 37L, in the same manner as that shown by the step S27 in FIG. 6. Further, the turn signal controller 38 determining the end of the course change outputs the control signal to the plunger 43, and makes the plunger 43 elongate.

Accordingly, the lock plate 45 is moved to the lower side, and is moved apart from the rear end portion of the turn signal switch 28. As a result, the turn signal switch 28 is automatically returned to the neutral position on the basis of the energizing force of a pair of springs 44 and 44.

In this case, the turn signal switch 28 can employ a lever switch operating the direction indicator of the motor vehicle. Further, the structure is made such that the lock plate 45 is moved apart from the turn signal switch 28 by making the plunger 43 elongate, however, the structure may be made such that the lock plate 45 is moved apart from the turn signal switch 28 by making the plunger 43 contract.

As described above, in accordance with the embodiment 2, since the turn signal switch 28 is structured as the alternate type switch, it is possible to automatically return the turn signal switch 28 to the neutral position in the case that the turn signal controller 38 determines the end of the course change. Therefore, since the embodiment 2 can operate in the same manner as the automatic return of the direction indicator at a time of driving the motor vehicle, it is possible to operate the direction indicator on the basis of a similar feeling to that of the motor vehicle steered by the steering wheel without confusing the operator. As mentioned above, in accordance with the second embodiment, in addition to the effect in the first embodiment 1, it is possible to achieve an effect that the course change can be executed without confusing the operator.

In this case, in the embodiment 1 and the embodiment 2, the description is given of the structure in which the turn signal controller 38 is independently formed from the main controller 31, however, the structure may be made such that the main controller 31 has the function serving as the turn signal controller.

Further, the description is given of the structure in which the means for detecting the steering angle $\theta$ of the vehicle detects by using the respective detection signals of the second potentiometer 29 provided in the joy stick 21 and the first potentiometer 30 provided in the rotary pin 16, however, the present invention is not limited to the structures.

For example, the structure may be made such that the steering angle $\theta$ is detected on the basis of the detection signal from the second potentiometer 29, and the structure may be made such that the steering angle $\theta$ is detected on the basis of the detection signal from the first potentiometer 30. As the steering angle of the vehicle, in place of using the first potentiometer 30 and the second potentiometer 29, a limit switch may be provided between the front vehicle body 14 and the rear vehicle body 15 so as to detect an angle between the front vehicle body 14 and the rear vehicle body 15.

Alternatively, the structure may be made such that a stroke sensor is additionally provided in the steering cylinders 17L and 17R so as to detect the angle between the front vehicle body 14 and the rear vehicle body 15 by measuring a length obtained by the stroke sensor. It is possible to detect the start and the end of the course change on the basis of the detection signals.

The description mentioned above is given by exemplifying the wheel loader 11 which can be articulated, and the description is given of the vehicle provided with the front vehicle body 14 and the rear vehicle body 15. The direction indicator in accordance with the invention is not limited to the direction indicator arranged in the wheel loader 11 which can be articulated. For example, the structure may be made such that the same potentiometer as the first potentiometer 30 is provided in the root of the joy stick 21, and the steering angle $\theta$ of the working vehicle is detected on the basis of the detection signal from the potentiometer, in the working vehicle such as the hydraulic excavator.

What is claimed is:

1. A direction indicator arranged in a vehicle steered by a joy stick, comprising:
   a turn signal switch making a turn signal lamp flash;
   a joy stick operation detector detecting an operation amount and an operation direction of the joy stick; and
   a turn signal controller executing a control on the basis of a steering angle of the vehicle, the steering angle detected by a detection signal from said joy stick operation detector,
   wherein the control on the basis of the steering angle is executed so as to automatically turn off the flashing turn signal lamp in a case that the steering angle of the vehicle becomes equal to or more than a fixed and desired first steering angle and thereafter becomes equal to or less than a fixed and desired second steering angle smaller than the first steering angle.

2. A direction indicator arranged in a vehicle, comprising:
   a turn signal switch making a turn signal lamp flash;
   an operation detector detecting an operation amount and an operation direction of a mechanism that is operated to turn the vehicle, and generating a detection signal based on the detected operation amount and operation direction;
   a steering angle detector that detects a steering angle of the vehicle based on the detection signal generated by the operation detector; and
   a turn signal controller executing control on the basis of the detected steering angle, the turn signal controller being configured to access a fixed and desired first steering angle and a fixed and desired second steering angle that is less than the first steering angle, to determine whether the detected steering angle transitions from an angle that is greater than the first steering angle to an angle that is less than the second steering angle, and to automatically turn off the flashing turn signal lamp when the detected steering angle is determined to transition from an angle that is equal to or more than the first steering angle to an angle that is equal to or less than the second steering angle.

3. The direction indicator of claim 2, wherein the vehicle is steered by a joy stick, wherein the operation detector is a joy stick operation detector, and wherein the mechanism that is operated to turn the vehicle is the joy stick.

4. The direction indicator of claim 2, wherein the vehicle is an articulated type vehicle.

5. A direction indicator arranged in a vehicle steered by a joy stick, the direction indicator comprising:
   a joy stick operation detector operatively coupled to the joy stick to detect an operation amount and an operation direction of the joy stick, and to generate operation amount and operation direction generating control signals used to inspire a change in a traveling direction of the vehicle from a first substantially straight going state and to return the traveling direction of the vehicle to a second substantially straight going state after the change in the traveling direction of the vehicle is completed; and
   a turn signal controller to control a turn signal lamp based on one or more control signals received from the joy stick operation detector, the turn signal controller being configured to:
   determine from the control signals received from the joy stick operation detector whether the traveling direction of the vehicle is being changed from the first substantially straight going state,
   determine whether the traveling direction of the vehicle is being returned to the second substantially straight going state,
   access first and second threshold values,
   determine whether one or more values associated with the control signals received from the joy stick operation detector are greater than or equal to the first threshold value when the traveling direction of the vehicle is determined to be changed from the first substantially straight going state,
   determine whether one or more values associated with the control signals received from the joy stick operation detector are less than the second threshold value when the traveling direction of the vehicle is determined to be returned to the second substantially straight going state, and place the turn signal lamp in an ON state as long as the values of the control signals received from the joy stick operation detector are determined to be greater than or equal to the first threshold value when the traveling direction of the vehicle is determined to be changed from the first substantially straight going state and also so long as the values of the control signals received from the joy stick operation detector are determined to be more than the second threshold value when the traveling direction of the vehicle is determined to be returned to the second substantially straight going state.

6. The direction indicator of claim 5, further comprising a turn signal switch to place the turn signal lamp in the ON state, wherein the turn signal controller receives input to place the turn signal lamp in the ON state from the turn signal switch.

7. The direction indicator of claim 5, wherein the turn signal lamp is an intermittently flashing turn signal lamp, and wherein placing the turn signal lamp in the ON state causes the turn signal lamp to flash intermittently.

8. A turn signal controller configured to perform operations comprising:

receiving a variable directional input to change a traveling direction of a vehicle, wherein the directional input includes a continuously varying steering angle representing an angle between a present course of the vehicle and an intended course of the vehicle;

in response to receiving the variable directional input, providing a signal to place a turn signal lamp positioned on the vehicle in an ON state;

determining that a value of the continuously varying steering angle is greater than a first steering angle;

in response to determining that the value of the steering angle included in the directional input is greater than the first steering angle, placing a course changing flag in an ON state, the course changing flag indicating that the vehicle is changing direction; and in response to determining that a value of the continuously varying steering angle is less than a second steering angle, placing the course changing flag in an OFF state and placing the turn signal lamp in an OFF state.

9. The turn signal controller of claim 8, wherein the traveling direction of the vehicle is controlled using a joy stick, the operations further comprising:

detecting an extent of a movement of the joy stick; and generating control signals representing the variable directional that correspond to the extent of the movement of the joy stick.

10. The turn signal controller of claim 8, the operations further comprising:

receiving the signal to place the turn signal lamp in the ON state from a controller operated by a turn signal switch;

detecting an end of the signal from the controller operated by the turn signal switch; and providing a second input to the turn signal lamp to retain the turn signal lamp in the ON state.

* * * * *